(12) United States Patent  
Chanda et al.

(10) Patent No.: US 8,505,029 B1  
(45) Date of Patent: Aug. 6, 2013

(54) VIRTUAL MACHINE COMMUNICATION

(75) Inventors: Rupen Chanda, San Francisco, CA (US); Chris Campbell, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1324 days.

(21) Appl. No.: 11/945,180

(22) Filed: Nov. 26, 2007

(51) Int. Cl.
*G06F 3/00* (2006.01)
*G06F 9/44* (2006.01)
*G06F 9/46* (2006.01)
*G06F 13/00* (2006.01)
*G06F 9/455* (2006.01)

(52) U.S. Cl.
USPC .............................. 719/313; 719/330; 718/1

(58) Field of Classification Search
None
See application file for complete search history.

(56) References Cited

U.S. PATENT DOCUMENTS

| | | | |
|---|---|---|---|
| 4,914,619 A * | 4/1990 | Harris et al. | 709/227 |
| 5,327,558 A | 7/1994 | Burke et al. | |
| 5,715,474 A | 2/1998 | Burke et al. | |
| 6,289,382 B1 * | 9/2001 | Bowman-Amuah | 709/226 |
| 6,658,573 B1 * | 12/2003 | Bischof et al. | 726/16 |
| 7,908,653 B2 * | 3/2011 | Brickell et al. | 726/22 |
| 2003/0074487 A1 | 4/2003 | Akgul et al. | |
| 2004/0019897 A1 * | 1/2004 | Taylor et al. | 719/330 |
| 2006/0249567 A1 * | 11/2006 | Byrne et al. | 235/379 |
| 2007/0130331 A1 | 6/2007 | Kao et al. | |
| 2007/0174429 A1 * | 7/2007 | Mazzaferri et al. | 709/218 |
| 2009/0089785 A1 | 4/2009 | Marwinski et al. | |

OTHER PUBLICATIONS

AllInterview.com, What is WLS T3 protocol, p. 1-4.*
JSR 75: PIM Optional Package Specification (2004) [retrieved on Nov. 26, 2007] from <URL: http://jcp.org/en/jsr/detail?id=75.
Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S. Appl. No. 10/791,311, filed Mar. 1, 2004, 27 pages.

* cited by examiner

*Primary Examiner* — H S Sough
*Assistant Examiner* — Craig Dorais
(74) *Attorney, Agent, or Firm* — Schwegman, Lundberg & Woessner, P.A.

(57) ABSTRACT

The present disclosure includes, among other things, systems, methods and program products for virtual machine communication. For example, one or more aspects of the subject matter described in this disclosure can be embodied in one or more methods that include constructing a first message on behalf of a first program executing in a first virtual machine. A second virtual machine is selected from one or more virtual machines. Security information for the first program is communicated to the second virtual machine. The first message is communicated from the first virtual machine to the second virtual machine, the first message to be processed by the second virtual machine with regard to the security information.

25 Claims, 7 Drawing Sheets

VIRTUAL MACHINE COMMUNICATION

BACKGROUND

A program executing in a virtual machine (e.g., a Java virtual machine) that needs to send a message to a program executing in another virtual machine may be able to access inter-process communication mechanisms provided in an underlying operating system. However, this approach assumes that the communication mechanisms provided by the sender's operating system are compatible with those of the receiver's operating system. Another technique is remote method invocation (RMI), such as Java RMI, which allows methods on an object in one virtual machine to be invoked by a program executing in a different virtual machine. A drawback of Java RMI is that its use can require altering existing classes to work within a stub/skeleton paradigm, which can be cumbersome for programmers.

SUMMARY

In general, one or more aspects of the subject matter described in this specification can be embodied in one or more methods that include constructing a first message on behalf of a first program executing in a first virtual machine. A second virtual machine is selected from one or more virtual machines. Security information for the first program is communicated to the second virtual machine. The first message is communicated from the first virtual machine to the second virtual machine, the first message to be processed by the second virtual machine with regard to the security information. Other embodiments of this aspect include corresponding systems, apparatus, and computer program products.

These and other embodiments can optionally include one or more of the following features. The security information can include a domain of the first program. The first message is received by the second virtual machine, a second program is selected to process the first message, and the second program is invoked. A second message is communicated from the second virtual machine to the first virtual machine, the second message is received by the first virtual machine, a second program is selected to process the second message, and the second program is invoked. Selecting a second virtual machine can be based on a status of the second virtual machine. The status can indicate whether the second virtual machine is able to accept a message. The message can include a set of name and value pairs. The first program does not need take part in the transferring.

Particular implementations of the subject matter described in this specification can realize one or more of the following advantages. Two or more virtual machines, or executing programs within the virtual machines, can communicate without the hassle of setting up RMI mechanisms. Messages can also be exchanged through an intermediate process or through inter-process communication mechanisms, even if the underlying operating systems are different. Security information is communicated between virtual machines to allow message processing in a receiving virtual machine to be performed with regard to security settings of a sending virtual machine. A sending virtual machine can select a receiving virtual machine based on the status of the receiving virtual machine.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
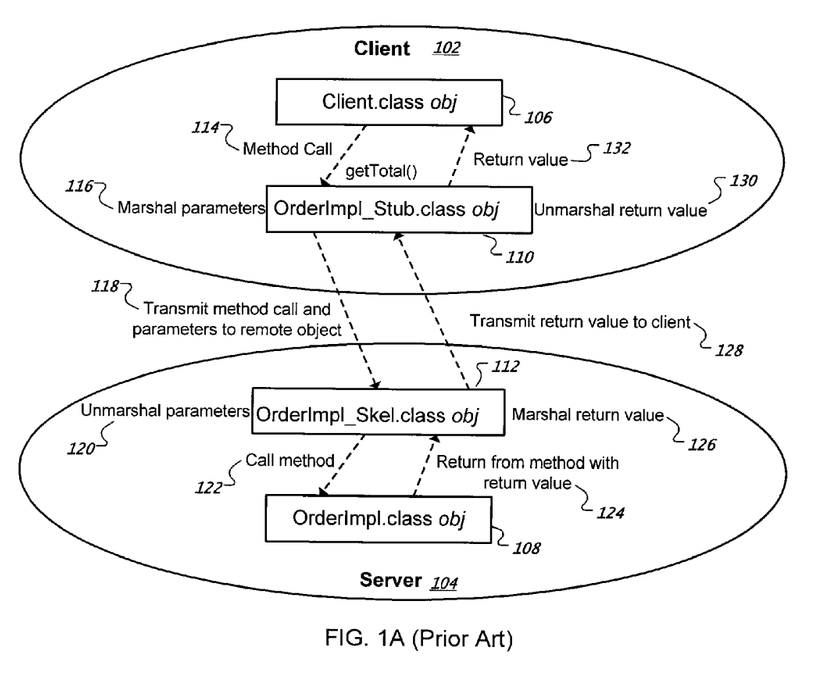
FIG. 1A illustrates prior art remote method invocation.

FIG. 1A illustrates prior art remote method invocation (RMI). RMI is a technique for a program in one Java Virtual Machine (JVM), e.g., 102, to invoke the methods of Java objects in other JVMs, e.g., 104. The Java programming language and Java RMI are available from Sun Microsystems, Inc. of Mountain View, Calif. By way of illustration, a client virtual machine 102 and a server virtual machine 104 can reside either on the same computing device or on different computing devices. The client virtual machine 102 includes a client object 106. The server virtual machine 104 includes a server object 108 which provides functionality through a set of methods. The client object 106 can remotely invoke the server object 108's methods. For example, if the server object 108 represents a sales order, the client object 106 can remotely invoke a server object 108 method to provide an order total.

In order to facilitate RMI, a stub object 110 and a skeleton object 112 are created to implement communication between the client virtual machine 102 and the server virtual machine 104. The stub object 110 resides in the client virtual machine 102 and the skeleton object 112 resides the server virtual machine 104. The stub object 110 is a client-side proxy for the remote server object 108. The stub object 110 forwards method calls to the skeleton object 112. The skeleton object 112 is a server-side proxy for the server object 108 and forwards method calls to the server object 108.

As indicated by reference 114, a program executing in client 102 can invoke a method on the client object 106, such as a "getTotal" method which can return the total of an order. The "getTotal" method call is forwarded to the stub object 110. As indicated by reference 116, the stub object 110 marshals parameters by encoding parameters in a format suitable for transport across a network. As indicated by reference 118, the stub object 110 forwards the method call request and marshaled parameters to the skeleton object 112. The skeleton object 112 unmarshals parameters (e.g., decodes), as indicated by reference 120, and then invokes the desired method 122 for the server object 108 with the decoded parameters.

The skeleton object 112 can receive a return value from the server object 108 when the method call completes (as indicated by reference 124). The skeleton object 112 marshals the return value (as indicated by reference 126). That is, the return value is encoded in a format suitable for transport over a network. The return value is sent to the client virtual machine 102, as indicated by reference 128. The stub object 110 receives and unmarshals the return value 130. The client object 106 then receives the return value from the stub object 110, as indicated by reference 132.

Figure 1B:
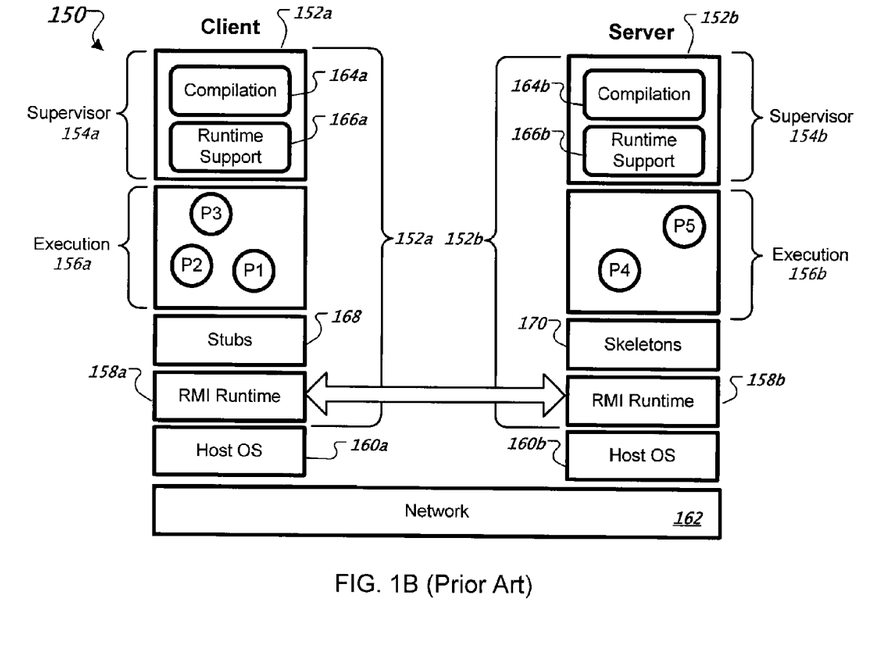
FIG. 1B illustrates a prior art system for remote method invocation.

FIG. 1B illustrates a prior art system 150 for remote method invocation. The system 150 illustrates virtual machine to virtual machine communication as implemented by Java RMI functionality. The environment 150 includes a client virtual machine 152a and a server virtual machine 152b. For example, the client virtual machine 152a can correspond to the client virtual machine 102, and the server virtual machine 152b can correspond to the server virtual machine 104. The client virtual machine 152a includes a supervisor component 154a, an execution component 156a, and an RMI runtime component 158a. Similarly, the server virtual machine 152b includes a supervisor component 154b, an execution component 156b, and an RMI runtime component 158b. The client and server virtual machines each execute on a host operating system (160a, 160b). The host operating systems 160a and 160b can be the same if, for example, the client virtual machine 152a and server virtual machine 152b are running on the same physical computing device. The operating systems 160a and 160b can communicate by sending messages over a network 162, for example.

The supervisor components 154a-b enable executing programs (or "processes"), such as Java programs, to run in execution components 156a-b, respectively. Generally speaking, a supervisor component provides services needed in order for processes to run, but does not execute the processes. The execution component 156a includes three example processes (shown here as P1, P2, and P3). The execution component 156b includes two example processes (shown as P4 and P5). Each example process has an associated runtime stack and program counter. By way of illustration, the supervisor component 154a can include a compilation component 164a and a runtime support component 166a. Similarly, the supervisor component 154b includes a compilation component 164b and a runtime component 166b. The compilation components 164a-b include support for parsing and translating source code (e.g. Java), loading and verifying byte code (e.g., Java byte code), and translating byte code into machine code. The runtime support components 166a-b include support for memory management, garbage collection, job scheduling, and type management, for example.

A stubs component 168 on the client virtual machine 152a includes the stub object 110, as discussed previously with respect to FIG. 1A. Likewise, a skeletons component 170 resides on the server virtual machine 152b and includes the skeleton object 112. The RMI runtime components 158a-b manage connections between the client virtual machine 152 and the server virtual machine 152b that facilitate RMI (e.g., connections between the stubs component 168 and the skeleton component 170). The RMI runtime component 158b includes a registry or state which indicates remote objects that are available to provide services. The server virtual machine 152b can register objects (e.g., the server object 108). The client process (e.g., "P1") can perform a lookup to determine which remote objects it can access, and to obtain an IP (Internet Protocol) address and port number of a virtual machine (e.g., server virtual machine 152b) which offers a desired service.

A process (e.g., P1) running on the client virtual machine 152a can communicate with a process (e.g., P4) running on the server virtual machine 152b. For example, the P1 process can perform operations associated with the client object 106 (discussed previously with respect to FIG. 1A). For example, the client object 106 can invoke a method of the server object 108 in server process P4. The P1 and P4 processes can communicate with each other using the stub object 110 and the skeleton object 112, as discussed previously with respect to FIG. 1A. For example, code running in the P1 process can invoke a method on the stub object 110. The stub object 110 invokes code in the RMI runtime component 158a to marshal data such as parameters and a method identifier. The RMI runtime component 158a then submits a message to the host OS 160a to deliver to the server virtual machine 152b across the network 162. The host OS 160b passes the message to the RMI runtime component 158b which unmarshals parameters and a method identifier and invokes a method on the skeleton object 112 through process P4.

Figure 1C:
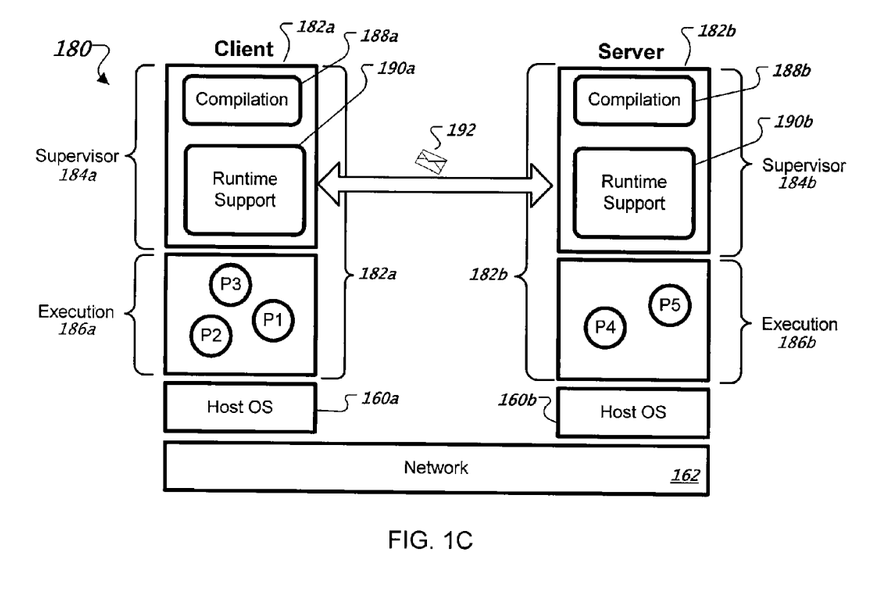
FIG. 1C illustrates an example system for communication between virtual machines.

FIG. 1C illustrates an example system 180 for communication between virtual machines. There can be fewer or more components in system 180, and components can be distributed across two or more computing devices. The system 180 includes a client virtual machine 182a and a server virtual machine 182b. In general, a virtual machine runs as an application on an operating system and creates a platform-independent runtime environment within itself that abstracts away some or all details of the underlying operating system and computing hardware. In some implementations, virtual machine processes are not visible as running applications to the underlying operating system since they run within virtual machine processes. Besides the JVM, other virtual machine's are contemplated including, but not limited to, Common Language Runtime, available from Microsoft Corporation, and virtual machines operable to run programs written in the ActionScript programming language, such as the Adobe Flash player, available from Adobe Systems Incorporated of San Jose, Calif.

The client virtual machine 182a includes a supervisor component 184a and an execution component 186a. Similarly, the server virtual machine 182b includes a supervisor component 184b and an execution component 186b. The supervisor components 184a-b enable processes to run in the execution components 186a-b, respectively. Similar to the execution component 156a of FIG. 1B, the execution component 186a includes three example processes (here, shown as P1, P2, and P3) and the execution component 186b includes two example processes (shown as P4 and P5). Each example process has an associated runtime stack and program counter.

The supervisor component 184a includes a compilation component 188a and a runtime support component 190a. Similarly, the supervisor component 184b includes a compilation component 188b and a runtime component 190b. In various implementations, the compilation components 188a-b can include one or more of: support for parsing and translating source code, loading and verifying bytecode, and translating bytecode into machine code. In various implementations, the runtime support components 190a-b can include support for one or more of: memory management, garbage collection, job scheduling, and type management.

The system 180 allows for communication between the client virtual machine 182a and the server virtual machine 182b. Virtual machine to virtual machine communication can take place through a general-purpose interface, without a need for other components (i.e., without the stub component 168, the skeleton component 170, or the RMI runtime components 158a-b, discussed previously with respect to FIG. 1B). Messages can be sent between the client virtual machine 182a and the server virtual machine 182b on behalf of processes or the supervisor components 184a-b.

For example, a message 192 can be constructed by a process (e.g., P1) executing in the client virtual machine 182a. In various implementations, a message 192 can include a collection of name and value pairs. Other message formats are possible, however. The server virtual machine 182b can be selected as a recipient of the message 192 from a group of one or more virtual machines based on an identifier provided by the sending process or some other means. In some implementations, the server virtual machine 182b is selected based on the result of determining the status of the supervisor component 184b. For example, the supervisor component 184b can indicate its status (e.g., busy, idle, able or not able to process the message 192, finished or not finished processing the message 192). As another example, the supervisor component 184b can indicate whether the server virtual machine 182b includes application code configured to process the message 192.

After selecting the server virtual machine 184b as the recipient of the message 192, a message transfer interface is established between the supervisor component 184a and the supervisor component 184b. The message transfer interface is programmatically accessible to processes in the client virtual machine 182a and the server virtual machine 182b by way of an application programming interface, for example. In some implementations, the message transfer interface is able to communicate messages over one or more networks. The message 192 is transferred by the supervisor component 184a to the supervisor component 184b using the message transfer interface. For example, the message 192 can be sent to a message queue or other storage associated with the supervisor component 184b. In some implementations, the storage is realized as a file or shared memory. Other storage means are possible. In some implementations, application code (e.g., P1) in the client virtual machine 182a does not take part in the transferring. In other implementations, the message 192 is sent to an intermediate process which is operable to provide the message 192 to the server virtual machine 182b on behalf of the client virtual machine 182a.

Upon receipt of the message 192, the supervisor component 184b can select application code to process the message 192. For example, the supervisor component 184b can select application code running in the P4 process. The application code selection may be based on the contents of the message 192, such as a message identifier and/or a message type. For example, the supervisor component 184b can determine application code which is configured to process particular messages or message types. The selected application code is invoked, and may, for example, process the message 192.

The supervisor component 184b can respond to the message 192 (for example, on behalf of application code running on the server virtual machine 182b). The supervisor component 184b can send a message 194 to the supervisor component 184a. The supervisor component 184a can select and invoke application code running on the client virtual machine 182a (e.g., P1) to process the message 194.

Figure 2:
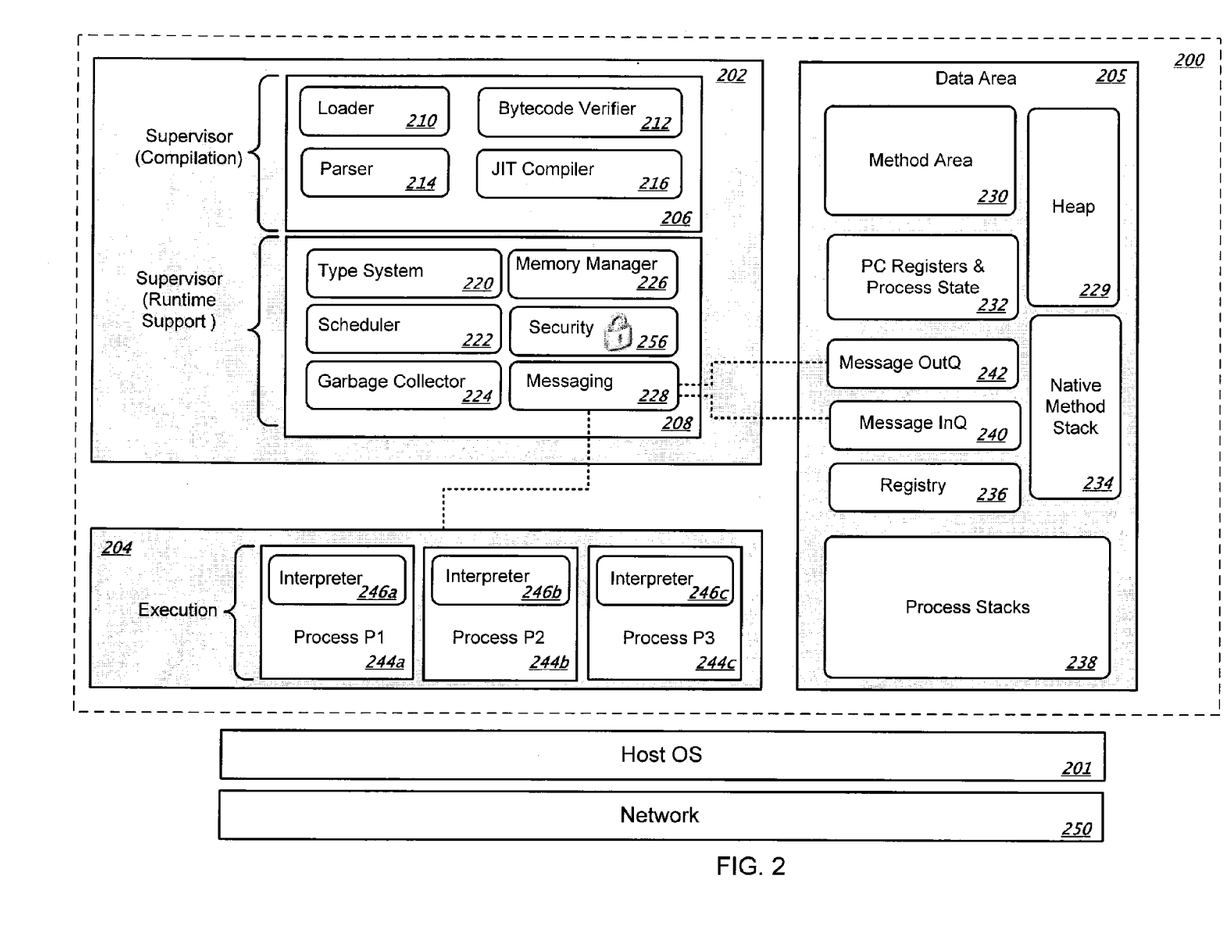
FIG. 2 illustrates a detailed view of an example virtual machine.

FIG. 2 illustrates a detailed view of an example virtual machine 200. The virtual machine 200 can be, for example, the client virtual machine 182a or the server virtual machine 182b (FIG. 1C). The virtual machine 200 runs on a host OS (Operating System) 201. The virtual machine 200 includes a supervisor component 202, an execution component 204, and a data area 205. The supervisor component 202 can be, for example, the supervisor component 184a or the supervisor component 184b (FIG. 1C). The execution component 204 can be, for example, the execution component 186a or the execution component 186b (FIG. 1C). The supervisor component 202 includes a compilation component 206 and a runtime support component 208. The runtime support component 208 can be, for example, the runtime support component 190a or the runtime support component 190b (FIG. 1C). The compilation component can be, for example, the compilation component 188a or the compilation component 188b (FIG. 1C).

The compilation component 206 includes a loader component 210, bytecode verifier component 212, a parser component 214, and a JIT (Just In Time) compiler 216. The loader component 210 loads program code such as source code (e.g., ActionScript, Java) or bytecode into the virtual machine 200. The parser component 214 parses the source code and generates bytecode which, generally speaking, is an intermediate language not specific to a particular microprocessor. The bytecode verifier component 212 receives bytecode from the loader component 210 or the parser component 214 and validates the bytecode to determine whether the bytecode is executable. The JIT compiler 216 translates bytecode into executable machine code.

The runtime support component 208 includes a type system component 220, a scheduler component 222, a garbage collector component 224, a memory manager component 226, a security component 256, and a messaging component 228. The type system component 220 manages types (e.g., object types) in the system. The type system 220 can, for example, keep track of classes, interfaces and object types loaded into the virtual machine 200 by the loader 210, and is used by the parser component 214 and by the execution component 204. The scheduler component 222 schedules and coordinates execution of programs. The garbage collector component 224 identifies objects that are no longer being referenced so that the memory being used by those objects can be freed and placed back onto a heap memory area 229. The heap memory area 229 is a part of the data area 205 used for dynamic memory allocation (e.g., memory allocated for object instances). The memory manager component 226 manages memory (e.g., memory allocation and deallocation) in the heap memory area 229, as well as in other parts of the data area 205.

The security component 256 is responsible for ensuring that processes (e.g., 244a-c) do not perform operations that would jeopardize the security of the virtual machine 200. In various implementations, program code is contained in Adobe Flash SWF format files and the security component 256 assigns a SWF file (or "SWF"), depending upon its origin, to one of the four so-called security "sandboxes". A remote sandbox applies to SWFs that originated from non-local Uniform Resource Locators (URLs). SWFs in this sandbox are not allowed access to any local file—they can load and access data within SWFS from non-local URLs provided they pass the cross-domain and cross-movie scripting verifications. A local-with-networking sandbox applies to SWFs that are on the local file system but will use networking. SWFs in this sandbox can access remote data but cannot read from local files. A local-with-filesystem sand box applies to SWFs that are on the local file system. These SWFs have access to local files but cannot communicate over the network. This is the default sandbox for SWFs. Finally, a local-trusted sand box is for privileged SWFs that have no restrictions. These SWFs can access local files as well as communicate remotely over the network.

In further implementations, in addition to the notion of a SWF being assigned to one of the four sandboxes, each SWF can also have a domain associated with it. An associated domain is the domain name of the location from where the SWF was loaded (SWFs from local file system belong to a single "unnamed" domain). For example, www.adobe.com is considered a different domain from labs.adobe.com. Cross-domain security restrictions come into play when a SWF that tries to load data or a SWF from another domain. Normally, such a loading operation across different domains is not permitted. To facilitate cross-domain loading of data/files, a policy file (e.g., at the destination location) should grant access to the requesting domain.

Another aspect of security is implicated when a SWF references data (e.g., variables, objects and functions) within another SWF. This is known as cross-movie scripting. Cross-movie scripting is generally permitted between SWFs that belong to the same domain. To facilitate cross-movie scripting between SWFs from different domains, the destination SWF (SWF which data is to be scripted) should to grant special permission to the source or requesting SWF's domain. The restrictions described with regards to cross-domain loading apply to cross-movie scripting as well. In other words, a SWF from non-secure domain should have a special permission to script a SWF in a secure domain.

In various implementations, the first SWF that is loaded to a virtual machine 200 is called a root SWF. The URL of the root SWF is known as the URL or the root URL. When a SWF (including root SWF) is downloaded, the SWF will be assigned one of the four sandbox types and a security domain identifier depending upon the SWF's domain of origin. The domain identifier maps to a domain context instance that is unique for each domain. The domain context instance will contain information such as the domain address and list of other domains that a SWF can access. In some implementations, script objects/script variables created for this SWF will have the same domain identifier and sandbox type as their parent SWF. At any instance during SWF playback, the virtual machine 200 will have a "current security domain" which is the domain identifier and sandbox of the SWF whose frame is being processed. Security checks can be performed assuming the "current security domain" as the requesting domain/sandbox. The "current security domain" is the domain context and sandbox of the current execution context's target.

In various implementations, cross-movie scripting security validation requires that every get or set operation on a script object or script variable will have to pass a security check. The security check will consist of two tests: 1) matching the sandbox of the source (requester) SWF against the sandbox of the current security domain (SWF being scripted); and 2) verifying that the domain context of the SWFs are the same or that the source SWF has proper permissions to script the target SWF.

In further implementations, for a SWF loaded into the virtual machine 200, security information deemed a security context will be provided that, in some implementations, consists of set of permissions, a base domain for the SWF, a sandbox identifier, or combinations of these. A security context can include other information, as well. The virtual machine 200 associates the security context with the corresponding SWF. Permissions grant or deny access to data or the ability to perform an operation, for example. By way of illustration, a permission can grant or deny access to a mobile phone address book. In some implementations, permissions are provided by a process outside of the virtual machine, such as a web browser or other client that hosts the virtual machine. SWFs belonging to the same library as a given SWF can inherit that SWF's permissions. When a process (e.g., 244*a-c*) sends a message to a target virtual machine, or at some other time, the security context is communicated to the target virtual machine. For example, a process in the target virtual machine that receives the message can be required to conform to the permissions, sandbox, domain, or combinations of these, of the sending process. In some implementations, the security context represents the operating permissions, domain, and sandbox of the sending process.

The data area 205 includes, in addition to the heap memory area 229, a method area 230, a PC (program counter) registers and process state area 232, a native method stack area 234, a registry area 236, a process stacks area 238, a message "InQ" (i.e., "in queue") 240, and a message "OutQ" (i.e., "out queue") 242. The method area 230 includes code for class methods. The PC registers and process state area 232 includes program counter and process state information for each process running in the execution component 204. The native method stack area 234 is used by supervisor code when supervisor code methods are called. The process stacks area 238 is used for holding data (e.g., local variables, object instances) used by processes running in the execution component 204.

The execution component 204 includes three example processes 244*a*, 244*b*, and 244*c* (shown as "Process P1", "Process P2", and "Process P3", respectively). Each of the processes 244*a-c* includes intermediate bytecode or native machine code for a corresponding program. The process 244*a* includes an interpreter 246*a*, the process 244*b* includes an interpreter 246*b*, and the process 244*c* includes an interpreter 246*c*. Each of the interpreters 246*a-c* include an execution engine which executes code for the respective process in a runtime loop. For example, the interpreters 246*a-c* can interpret and execute bytecode, execute native code, etc.

Each process 244*a-c* and the supervisor 202 can communicate with the messaging component 228. The messaging component 228 implements the messaging subsystem of the virtual machine 200. In various implementations, the messaging component 228 is exposed as a class and associated methods that user programs (e.g., Process P1) can utilize to send and receive messages. The messaging component can receive messages (e.g., from other virtual machines) and security information in the message "InQ" 240. The message "OutQ" 242 can hold messages and security information to be sent to other virtual machines. Messages can include a set of name-value pairs, for instance.

When the messaging component processes a message in the "InQ" 240 it can invoke one or more callback methods for processes (e.g., 244*a-c*) or other code that is registered to receive messages. A process (e.g., 244*a-c*) can send a message by providing the message to the messaging component 228. In response to receiving a message from a process, the messaging component 228 can place the received message in the "OutQ" 242. The messaging component 228 can periodically send messages from the "OutQ" 242 to one or more virtual machines configured as destinations of outgoing messages, over a network 250.

An Internet Protocol (IP) address and port number of the destination virtual machine can be looked up in the registry 236.

In some implementations, the messaging component 228 can marshal and demarshal message information. For example, the messaging component 228 can encode message information into a machine independent format before sending a message. Also, upon receipt of a message (i.e., upon processing a message from the "InQ"), the messaging component 228 can decode encoded machine-independent message information into a machine-dependent format.

Figure 3A:
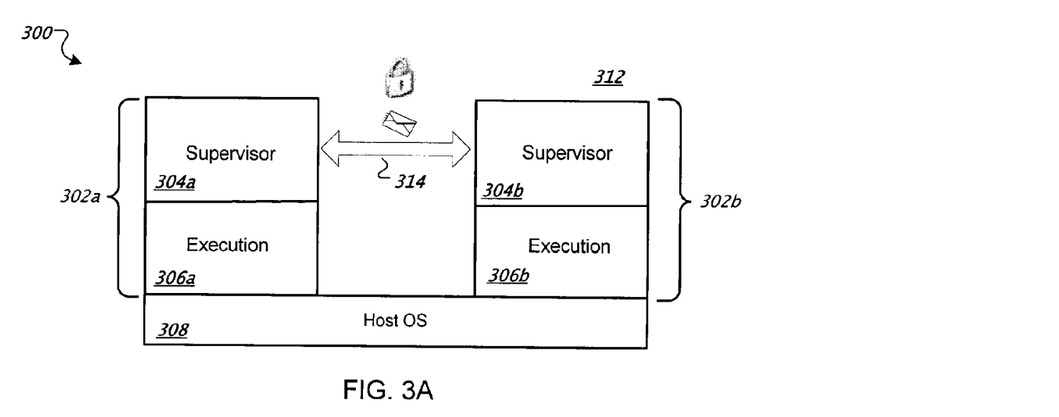
FIGS. 3A-3B illustrate example message sending and receiving scenarios.
Figure 3B:
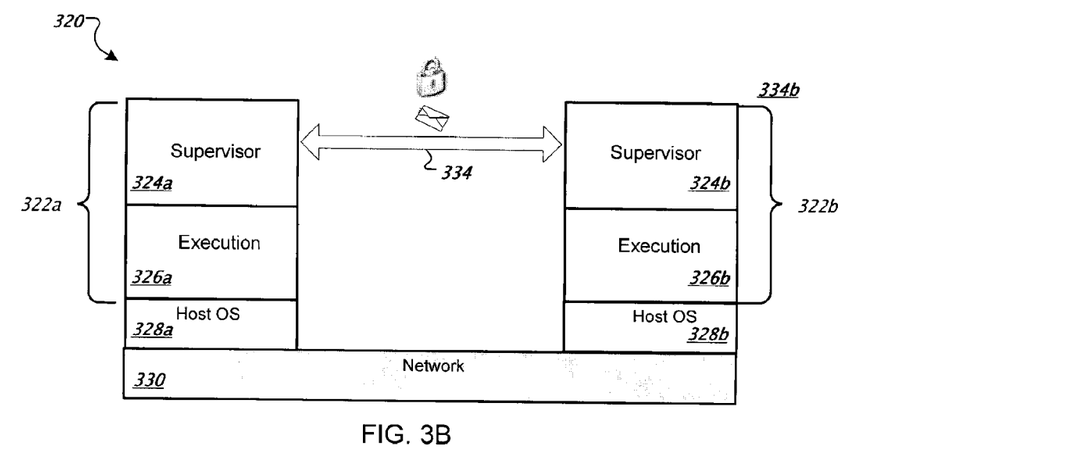

FIGS. 3A-3B illustrate example message sending and receiving scenarios. In, FIG. 3A, a scenario 300 includes a client virtual machine 302*a* and a server virtual machine 302*b*. The client virtual machine 302*a* includes a supervisor component 304*a* and an execution component 306*a*. The server virtual machine 302*b* includes a supervisor component 304*b* and an execution component 306*b*. The client virtual machine 302*a* and the server virtual machine 302*b* run on a host OS 308 and reside on the same physical computing device.

Messages can be sent, for example, from the client virtual machine 302*a* to the server virtual machine 302*b*, or vice versa. For example, the messaging component (e.g., 228 of FIG. 2) of the supervisor component 304*a* can receive the message 314 from a process running in the execution component 306*a*. The supervisor component 304*a* can place the message 310 and, optionally, security information, into an "out queue" (e.g., 242 of FIG. 2). A message transfer mechanism can take the message 314 (and the security information) out of an "out queue" associated with the supervisor component 304*a* and place the message 314 (and the security information) into an "in queue" (e.g., 240 of FIG. 2) associated with the supervisor component 304*b*. The supervisor component 304*b* can then invoke a callback method in the execution component 306*b*, and the callback method can process the message 310 as permitted by the security information, if such information was provided. In some implementations, the message transfer mechanism is realized as a common memory area accessible to the virtual machines or by a communication protocol that optionally uses network services provided by the host OS 208. Other message transfer mechanisms are possible.

In, FIG. 3B, a second scenario 320 includes a client virtual machine 322*a* and a server virtual machine 322*b*. The client virtual machine 322*a* includes a supervisor component 324*a* and an execution component 326*a*. The server virtual machine 322*b* includes a supervisor component 324*b* and an execution component 326*b*. The client virtual machine 322*a* runs on a host OS 328*a* and the server virtual machine runs on a host OS 328*b*. The client virtual machine 322*a* and the server virtual machine 322*b* reside on different physical devices.

The network 330 can be one or more wired or wireless networks, such as the Internet, a LAN (Local Area Network), a WAN (Wide Area Network), or some other kind of network.

By way of illustration, a message 334 is sent from the client virtual machine 322*a* to the server virtual machine 322*b*. The supervisor component 324*a* can receive the message 334 from a process running in the execution component 326*a*. The supervisor component 324*a* can place the message 334 into an "out queue" (e.g., 242 of FIG. 2) with, optionally, security information. The messaging component in the supervisor 324*a* can invoke a host-level transfer process 334*a* which can invoke an OS command in the host OS 328*a* to send the message 334 (and the security information) to the server virtual machine 322*b* across the network 330. For example, the host OS can open a socket and perform a write command. The message 334 is sent over the network 330 to the server virtual machine 322*b* and is read by a host OS 328*b* on the server virtual machine 322*b*. The message 334 (and the security information) is received by a host-level transfer process 334*b*, which can place the message 334 into an "in queue" associated with a messaging component of the supervisor component 324*b*. The supervisor component 324*b* can invoke a callback method to be run in the execution component 326*b* and the callback method can process the message 310 as permitted by the security information, if such information was provided.

Figure 4:
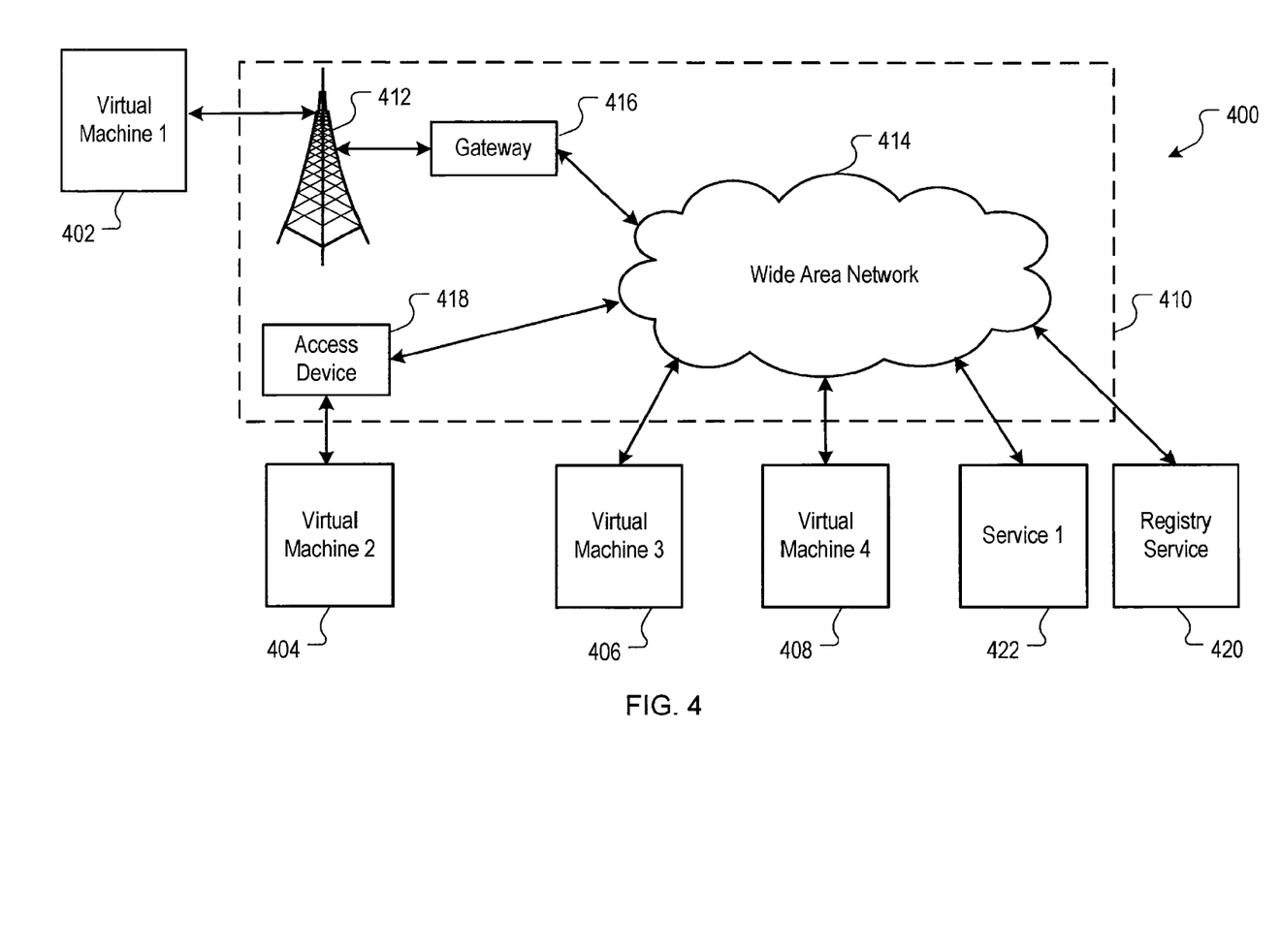
FIG. 4 is a block diagram of an example network operating environment for communication between virtual machines.

FIG. 4 is a block diagram of an example network operating environment 400 for communication between virtual machines. Virtual machines 402, 404, 406 and 408, for example, can communicate over one or more wired and/or wireless networks 410 in data communication. For example, a wireless network 412, e.g., a cellular network, can communicate with a wide area network (WAN) 414, such as the Internet, by use of a gateway 416. Likewise, an access device 418, such as an 802.11g wireless access device, can provide communication access to the wide area network 414. Virtual machines 402, 404, 406 and 408 can establish data communication over the wireless network 412, gateway 416, and wide area network 414 using, for example, TCP/IP or UDP protocols.

By way of illustration, the virtual machine 404 can connect to the network 414 through the access device 418. The access device 418 can be, for example, a set-top box, a mobile device, a router, a bridge, or a personal computer (e.g., the access device 418 can be the physical computing device which the virtual machine 404 runs on). The virtual machine 402 can connect to the wireless network 412. The virtual machines 406 and 408 can connect to the network 414 using a wired and/or wireless connection. Messages can be sent to and from the virtual machines 402-408. The virtual machines 402-408 can look up an IP (Internet Protocol) address and port number associated with a destination virtual machine using a registry service 420, for example. A service 422 can receive messages from and/or send messages to the virtual machines 402-408 (i.e., the sender or recipient of a message can be a service (e.g., process) rather than a virtual machine).

Figure 5:
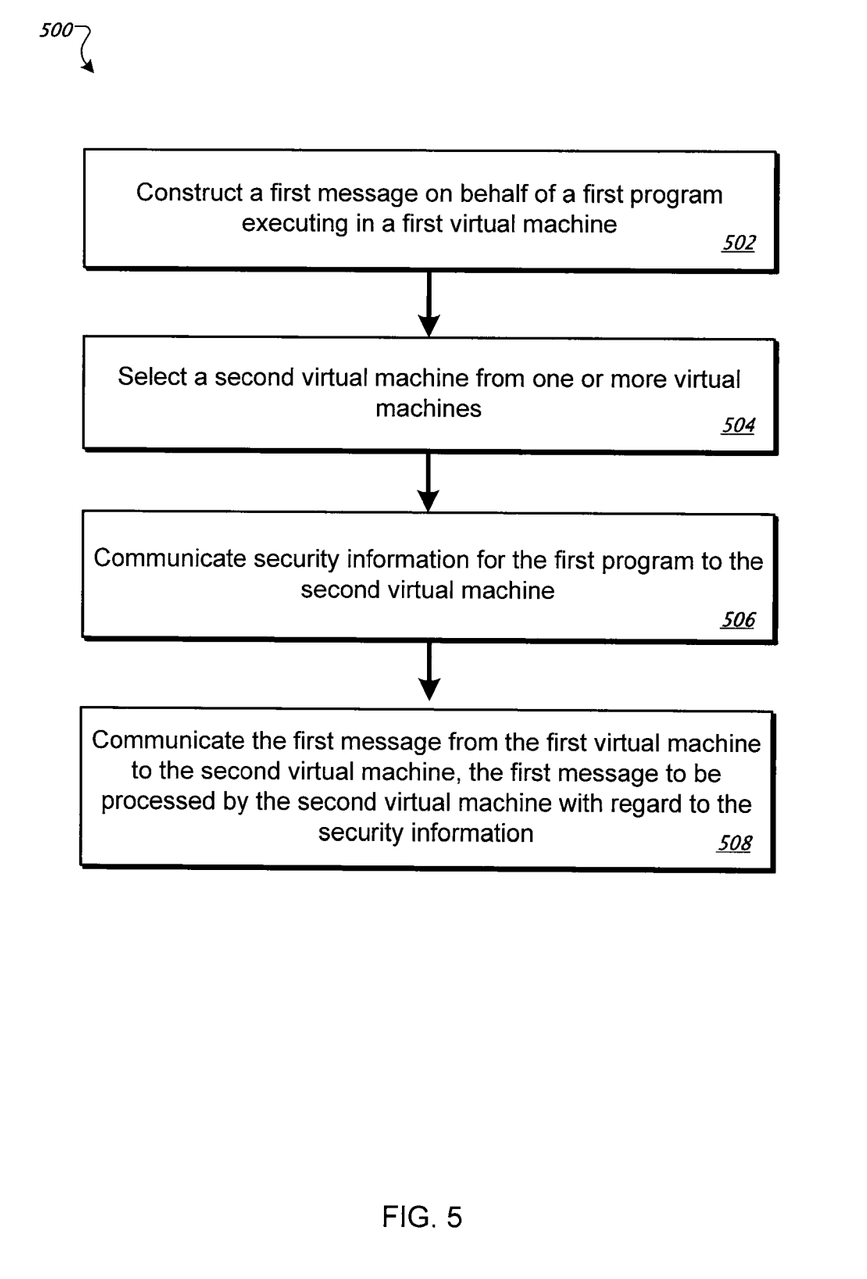
FIG. 5 is a flowchart of an example technique for virtual machine to virtual machine communication.

FIG. 5 is a flowchart of an example technique 500 for virtual machine to virtual machine communication. A first message is constructed on behalf of a first program executing in a first virtual machine (step 502). For example, with respect to FIG. 3A, the message 314 can be constructed on behalf of application code running in the execution component 306*a* of the virtual machine 302*a*, where the virtual machine 302*a* also includes the supervisor component 304*a*. A second virtual machine from one or more virtual machines is then selected (step 504). For example, the virtual machine 404 can be selected from the virtual machines 402-408 (FIG. 4). As another example, the server virtual machine 302*b* can be selected (FIG. 3A). Security information for the first program is then communicated to the second virtual machine (step 506). The first message is then communicated from the first virtual machine to the second virtual machine, the first message to be processed by the second virtual machine with regard to the security information (step 508). For example, message input and output queues (e.g., 240, 242 of FIG. 2) and a messaging component (e.g., 228 of FIG. 2) can be used to communicate security information and the first message between the virtual machines.

Figure 6:
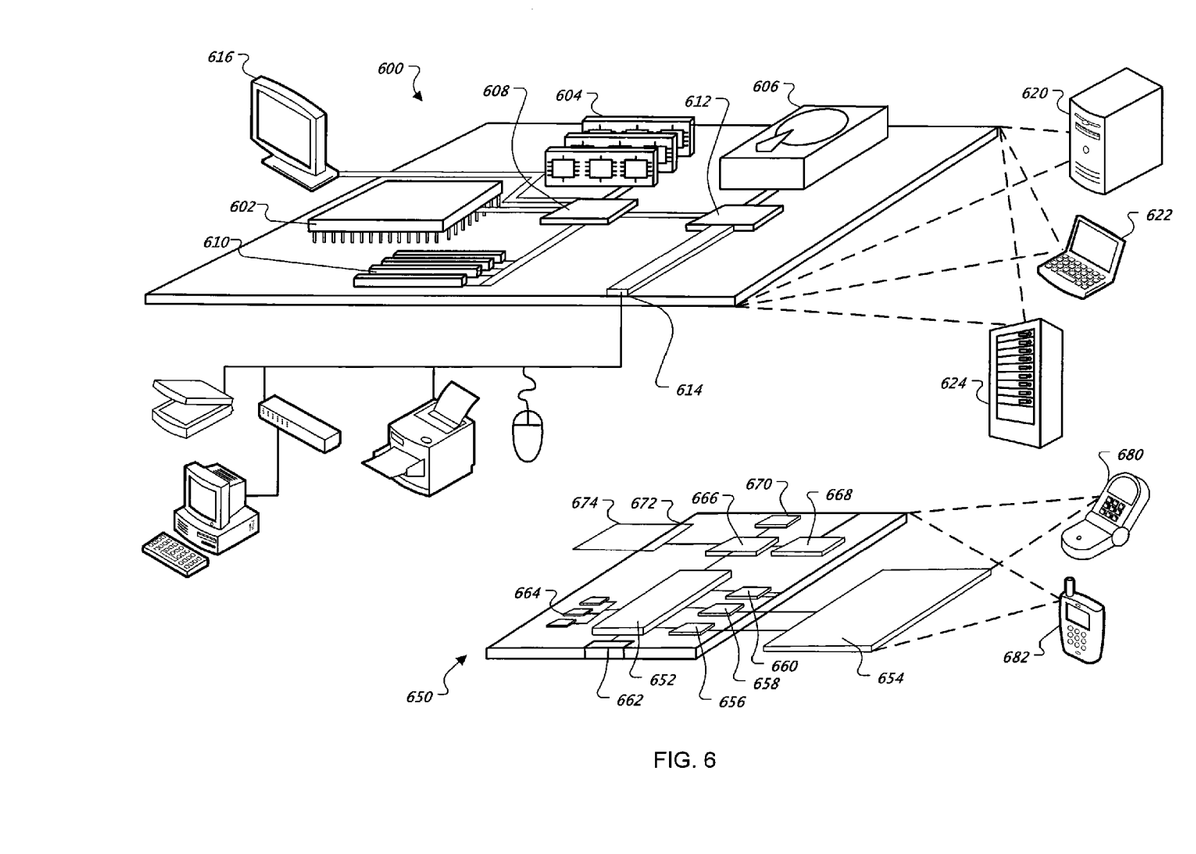
FIG. 6 is a block diagram of computing devices.

FIG. 6 is a block diagram of computing devices 600 and 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. Such instructions can implement techniques and systems described above, for example. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units. The memory 604 can store user code, such as code associated with the object 106, and supervisor code associated with a virtual machine, such as the client virtual machine 102.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602. The storage device 606 can store user code, such as code associated with the object 106, and supervisor code associated with a virtual machine, such as the client virtual machine 102.

The high speed controller 608 manages bandwidth-intensive operations for the computing device 600, while the low speed controller 612 manages lower bandwidth-intensive, operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, comprising:
constructing a first message on behalf of a first program executing in a first virtual machine;
selecting a second virtual machine from one or more virtual machines;
communicating security information for the first program to the second virtual machine, where the security information indicates a security sandbox associated with the first program;
communicating the first message from the first virtual machine to the second virtual machine, the first message to be processed by the second virtual machine with regard to the security information and the security sandbox,
where communicating the security information and communicating the first message are performed without remote method invocation (RMI), stub, and skeleton components.

2. The method of claim 1 where the security information includes a domain of the first program.

3. The method of claim 1, further comprising:
receiving the first message by the second virtual machine;

selecting a second program to process the first message; and invoking the second program.

4. The method of claim 1, further comprising:

communicating a second message from the second virtual machine to the first virtual machine;

receiving the second message by the first virtual machine;

selecting a second program to process the second message; and invoking the second program.

5. The method of claim 1 where selecting a second virtual machine is based on a status of the second virtual machine.

6. The method of claim 5 where the status indicates whether the second virtual machine is able to accept a message.

7. The method of claim 1 where the message includes a set of name and value pairs.

8. The method of claim 1 where the first program does not take part in communicating the security information and communicating the first message.

9. A computer program product, encoded on a non-transitory computer-readable medium, operable to cause data processing apparatus to perform operations comprising:

constructing a first message on behalf of a first program executing in a first virtual machine;

selecting a second virtual machine from one or more virtual machines;

communicating security information for the first program to the second virtual machine, where the security information indicates a security sandbox associated with the first program; and communicating the first message from the first virtual machine to the second virtual machine, the first message to be processed by the second virtual machine with regard to the security information and the security sandbox, where communicating the security information and communicating the first message are performed without remote method invocation (RMI), stub, and skeleton components.

10. The computer program product of claim 9 where the security information includes a domain of the first program.

11. The computer program product of claim 9 where the operations further comprise:

receiving the first message by the second virtual machine;

selecting a second program to process the first message; and invoking the second program.

12. The computer program product of claim 9 where the operations further comprise:

communicating a second message from the second virtual machine to the first virtual machine;

receiving the second message by the first virtual machine;

selecting a second program to process the second message; and invoking the second program.

13. The computer program product of claim 9 where selecting a second virtual machine is based on a status of the second virtual machine.

14. The computer program product of claim 13 where the status indicates whether the second virtual machine is able to accept a message.

15. The computer program product of claim 9 where the message includes a set of name and value pairs.

16. The computer program product of claim 9 where the first program does not take part in communicating the security information and communicating the first message.

17. A system comprising:

a first virtual machine on a first computing device;

a second virtual machine on a second computing device; and where the first computing device has encoded on a computer-readable medium instructions operable to cause the first computing device to perform operations comprising:

constructing a first message on behalf of a first program executing in the first virtual machine;

communicating security information for the first program to the second virtual machine, where the security information indicates a security sandbox associated with the first program; and communicating the first message from the first virtual machine to the second virtual machine, the first message to be processed by the second virtual machine with regard to the security information and the security sandbox, where communicating the security information and communicating the first message are performed without remote method invocation (RMI), stub, and skeleton components.

18. The system of claim 17 where the first computing device is distinct from the second computing device.

19. The system of claim 17 where the security information includes a domain of the first program.

20. The system of claim 17, further comprising:

receiving the first message by the second virtual machine;

selecting a second program to process the first message; and invoking the second program.

21. The system of claim 17, further comprising:

communicating a second message from the second virtual machine to the first virtual machine;

receiving the second message by the first virtual machine;

selecting a second program to process the second message; and invoking the second program.

22. The system of claim 17 where selecting a second virtual machine is based on a status of the second virtual machine.

23. The system of claim 22 where the status indicates whether the second virtual machine is able to accept a message.

24. The system of claim 17 where the message includes a set of name and value pairs.

25. The system of claim 17 where the first program does not take part in communicating the security information and communicating the first message.

* * * * *